INVENTOR.
FRANCESCO COLLURA
BY
ATTORNEY.

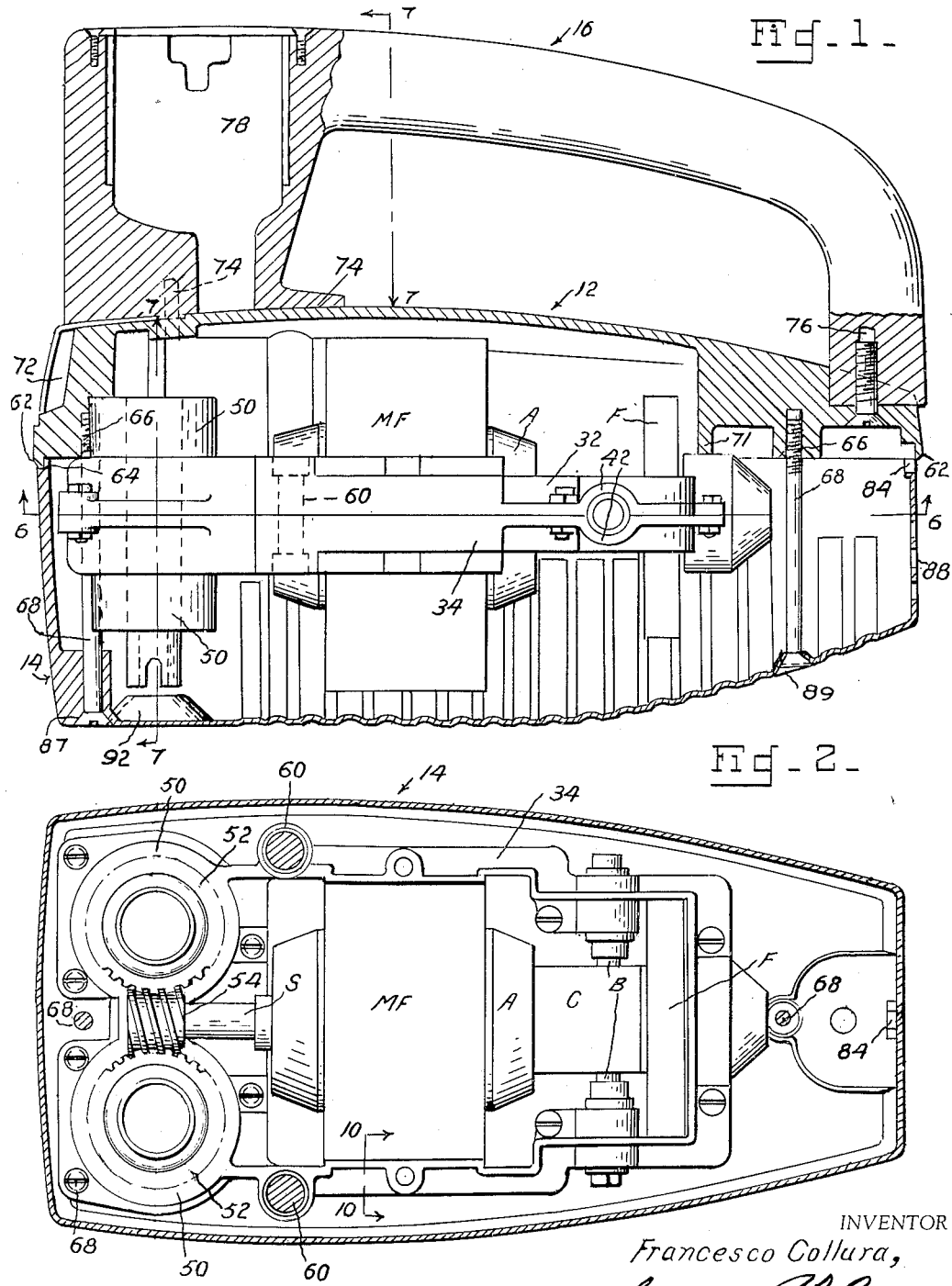

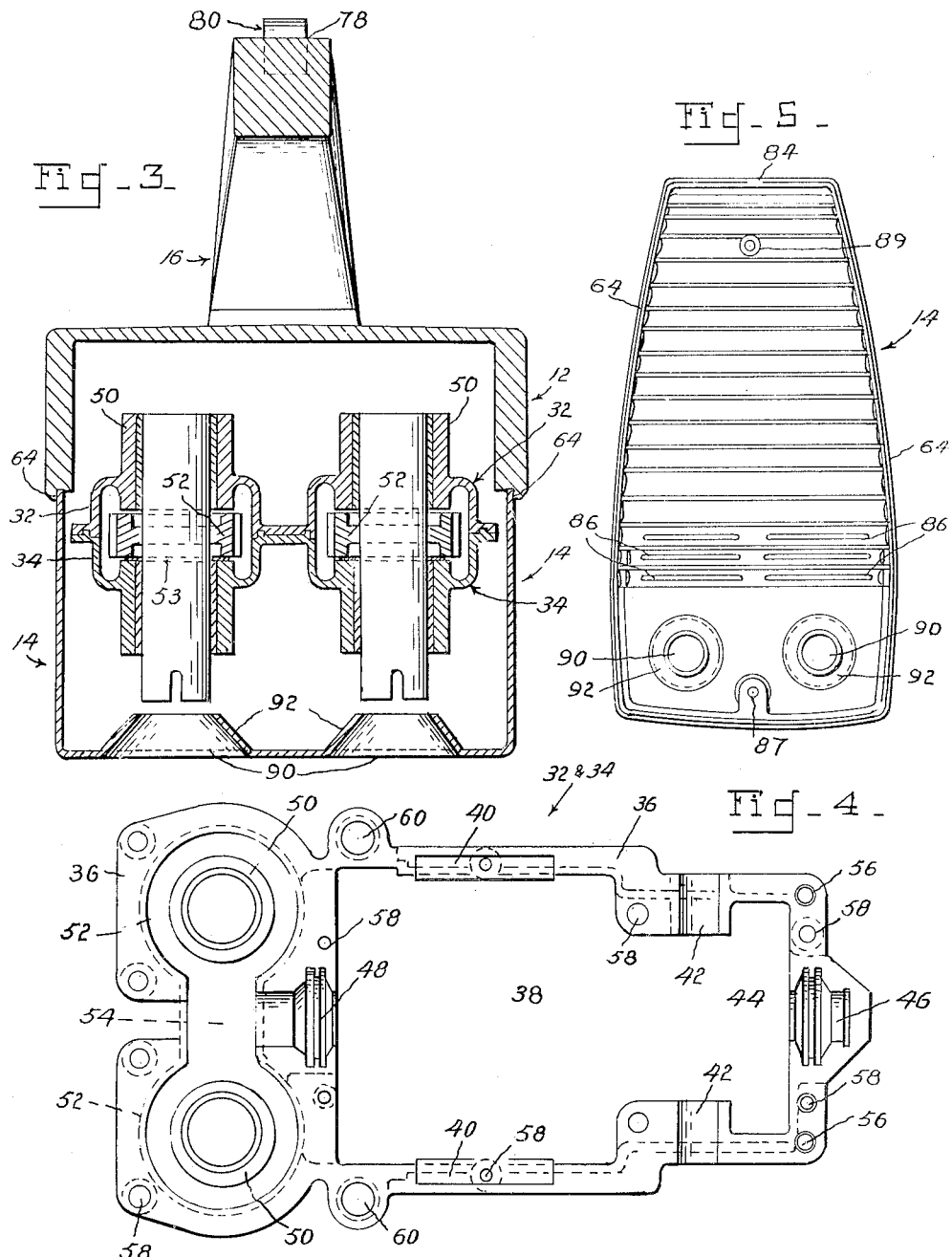

United States Patent Office 2,719,238
Patented Sept. 27, 1955

2,719,238

ELECTRIC MOTOR FOR HAND TOOLS

Francesco Collura, New York, N. Y., assignor to The Winsted Hardware Manufacturing Company, Winsted, Conn., a corporation of Connecticut Original application February 19, 1952, Serial No. 272,343. Divided and this application August 29, 1952, Serial No. 308,748

16 Claims. (Cl. 310—68)

This invention relates to improvements in electric motors for hand tools, particularly portable hand mixers for stirring or mixing foods and beverages or ingredients of other character and this application is a division of my co-pending application Serial No. 272,343, filed February 19, 1952, now abandoned.

It is an object of the invention to facilitate access to the motor for servicing and repairing and, to this end, the invention contemplates supporting the motor horizontally in an upper casing shell having a lower cover which may be readily detached to provide access to the motor along its length without the necessity of removing the same from its casing. The invention further contemplates mounting the motor in a longitudinally split frame which may be removably secured to the upper casing shell, the said frame being formed of opposed upper and lower substantially identical brackets, whereby removal of one bracket will expose all parts of the motor for replacement or repair.

A further object of the invention is to provide for ease and convenience of operating the device through an upright handle carried by the upper casing shell and provided with a forward recessed portion for reception of a thumb operated selective speed control switch.

Other and further objects and advantages will be apparent from the following detailed description taken in conjunction with the accompanying drawings wherein a preferred embodiment of the principles of the invention has been selected for exemplification.

In the drawings:

Fig. 1 is a side elevational view of a device constructed in accordance with the invention with the switch removed and showing the handle and casing portions in vertical section;

Fig. 2 is a sectional view taken on the line 2—2 of Fig. 1;

Fig. 3 is a sectional view taken on the line 3—3 of Fig. 1;

Fig. 4 is a plan view of the motor support bracket as shown in Figs. 1–3;

Fig. 5 is a bottom plan view of the lower casing shell.

Figure 6:
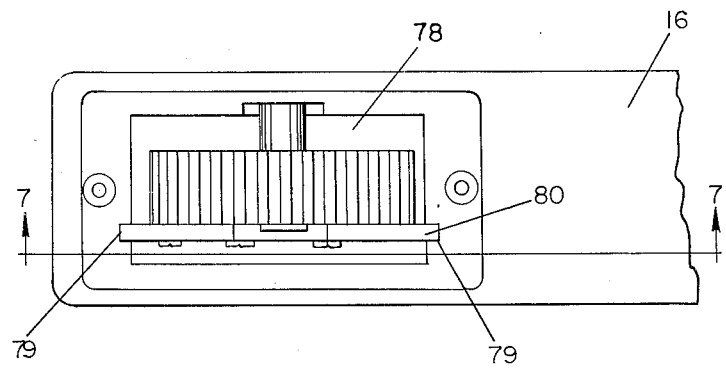
Fig. 6 is a fragmentary plan view of the handle portion as shown in Fig. 1 with the plate removed and showing the speed control switch mounted in the handle recess.

Referring more particularly to the drawings, wherein like numerals refer to like parts, the electric motor device shown in Fig. 1 is comprised generally of a body portion or motor casing formed of an upper shell 12 and a lower covering shell 14. A handle 16 is secured to the upper shell 12 and depending from the casing may be a beater assembly such as a pair of blade assemblies, not shown.

The electric motor may be of any suitable conventional kind, preferably of the round field, double winding and variable speed type. The motor mounting, however, constitutes a novel and important feature of the invention.

Such mounting is formed of upper and lower brackets 32 and 34, respectively, which extend the length of and provide a complete support for the motor as well as its drive shaft and beater spindle driving gears. The brackets 32 and 34 may be die cast and for economy of manufacturing may be identical except for the cored holes for connection screws.

As shown, each bracket 32 and 34 comprises a generally rectangular frame 36 which defines a central opening 38 for receiving the motor field MF and armature A. The portion of the frame bordering this area is preferably provided with a recessed angular seat 40 for receiving the extended motor field lamination tab. For supporting the brushes B, opposed sides of the frame 36 just rearwardly of the central opening 38 are formed with semi-cylindrical portions 42 into which the brush sleeves fit. An enlarged space 44 is provided for the motor fan F adjacent to the rearward end of the bracket wherein semi-cylindrical recesses 46 are provided as bearing housings for the rotation and thrust of the rearward end of the motor shaft S. Front bearing housings 48 provided at the forward portion of the frame 36 may be similar to the rear housings 46 except for the thrust bearing, as shown.

The forward end portion of the frame 36 terminates in a pair of spaced cylindrical collars 50 for housing the gears 52 and bearing 53 in driven engagement with the driving worm 54 keyed to the forward centrally projecting end of the motor shaft S. Dowel holes 56 for registering opposed brackets 32 and 34 and tapped cores 58 for reception of securing screws, as shown, are distributed at suitably spaced intervals around the periphery of frame 36 and mating apertures such as at 60 are provided for reception of screws to secure the motor and its mounting brackets 32 and 35 within the upper housing shell 12.

It will be apparent that the provision of the elongated motor mounting bracket members 32 and 34 enables the convenient assembly of the motor sandwich-wise and that all parts of the motor are exposed for replacement or repair upon removal of the upper bracket. This novel manner of assembly is in contrast with the conventional axially assembled and mounted motors wherein the outer parts must be removed before access can be had to the intermediately positioned parts.

The upper casing shell 12 may be die cast and formed of any suitable material. In one particularly attractive embodiment of the invention, the upper shell 12 and the lower shell 14 may be plated or coated with contrasting materials such as colored enamel and chrome. The shell 12, as shown, may be provided with a plurality of upright ribs 61 and the skirt or peripheral portion of the shell carries an annular shoulder 62 to receive the upper lip 64 of the lower cover shell 14. Shell 12 further carries at its opposed ends tapped cores 66 to receive the threaded ends of shell securing screws 68. Additional tapped cores 70 are provided for securing screws passing through the bracket apertures 60 whereby to fasten the motor supporting frame to the shell and a shoulder 71 is provided against which the rearward end portion of the frame bears. The forward end of the shell 12 may have a recessed outer surface for reception of a flush name plate if desired and is slotted as shown at 72 to provide a vent for circulation of cooling air for the motor.

Figure 7:
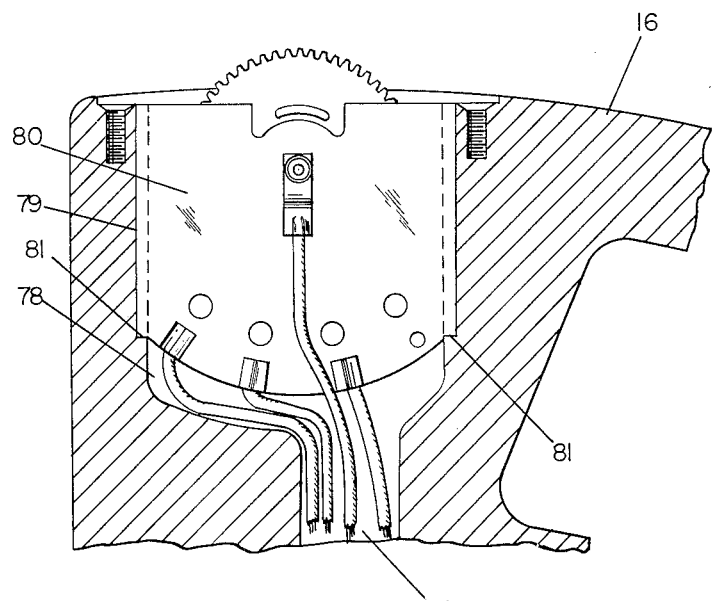
Fig. 7 is a sectional view taken on the line 7—7 of Fig. 6.

For securing the handle member 16 to the shell, forward and rearward apertures 74 and 76, respectively, may be provided for reception of connecting screws. In the preferred construction, the handle 16 is provided with a recess 78 in its forward upright leg portion for reception of a suitable thumb controlled electric operating switch indicated in its entirety at 80, such as disclosed, in detail, for example, in Patent Nos. 2,707,741 and 2,708,227. Opposed grooves 79 are provided in the walls of recess 78 as shown in Figs. 1 and 7 for receiving opposed edge portions of the switch plate whereby to mount the switch with the recess. As further shown in Figs. 1 and 7, the grooves 79 may terminate in or be provided with shoulders 81 against which the edges of the switch plate may abut to limit the insertion of the switch 80 in the recess 78 to the position desired. The opening 82 is accordingly provided in the shell wall beneath the handle connection for the passage of current connecting wires for the switch and the rear end opening 84 permits wired connection of the motor with any suitable source of electric current.

Inasmuch as the motor is carried by the upper shell 12 as above described, the lower shell 14 serves merely as a casing cover and may therefore be constructed of any relatively thin light weight material decorated and contoured as desired. Desirably, however, the shell 14 as best shown in Figs. 1 and 13 is provided with bottom and rear end slotted wall portions 86 and 88, respectively, for intake and exhaust of motor cooling air in conjunction with the forward opening 72. Forward and rearward apertures, 87 and 89, respectively, are for reception of the shell connecting screws 68.

As a further feature of the invention, the apertures 90 at the forward end of the shell 14 through which the spindles of the beater assemblies may project for connection with the drive gears 52 are surrounded by an inwardly tapering wall portion 92 which serves as a guide for accurately positioning the spindles 26 in axial connection alignment with the gear drive shafts. It is to be noted that this driving connection for the spindles does not project from the motor casing as in prior art constructions but is disposed solely within the shell portions 12 and 14 with the accompanying advantages of protection of the parts and increased sanitation. The annular tapered guides 92 are therefore a particularly useful adjunct to this construction.

It is understood that the present invention is not confined to the precise construction and arrangement herein illustrated and described but embraces all the various modifications thereof as come within the scope of the following claims.

I claim:

1. A mixing device comprising, an electric motor adapted to drive a mixing element, a housing for said motor, an elongated handle carried by said housing, a recessed portion in one end of said handle, opposed grooves in opposed wall portions defining said recessed portion and switch means for said motor, the said switch means including a plate and said plate being supported at its opposed edges in said grooves whereby to mount said switch means in said recessed portion.

2. A mixing device comprising, an electric motor adapted to drive a mixing element, a housing for said motor, an elongated handle carried by said housing, said handle providing a finger grip body portion and a thumb rest at one end thereof, a recessed portion in said handle at the thumb rest end thereof, opposed grooves in opposed wall portions defining said recessed portion and thumb controlled switch means for said motor including a switch plate, said plate being supported at its opposed edges in said grooves whereby said switch means is mounted in said recessed portion.

3. A mixing device comprising, an electric motor adapted to drive a mixing element, a housing for said motor, an elongated handle carried by said housing, said handle being substantially yoke shaped and having the opposed legs thereof secured to opposed end portions of said housing, a recessed area in one of said legs, opposed grooves in opposed wall portions defining said recessed area and switch means for said motor, the said switch means including a plate and said plate being supported at its opposed edges in said grooves whereby to mount said switch means in said recessed area.

4. A mixing device comprising, a normally horizontally disposed electric motor adapted to drive a mixing element, upper and lower axially disposed mounting brackets for said motor, upper and lower separable shells for housing said motor and mounting brackets, the said upper shell being formed of heavier material than said lower shell, an elongated handle carried by said upper shell, said handle providing a finger grip body portion and a thumb rest at one end thereof, a recessed portion in said handle at the thumb rest end thereof, opposed grooves in opposed wall portions defining said recessed portion and thumb controlled switch means for said motor, the said switch means including a plate and said plate being supported at its opposed edges in said grooves whereby said switch means is mounted in said recessed portion.

5. A mixing device comprising, an electric motor adapted to drive a mixing element, a housing for said motor, an elongated handle carried by said housing, a recessed portion in one end of said handle, opposed grooves and shoulders in opposed wall portions defining said recessed portion and switch means for said motor, the said switch means including a plate, edges of said plate being supported in said grooves and against said shoulders whereby to mount said switch means in said recessed portion.

6. A mixing device comprising, an electric motor adapted to drive a mixing element, a housing for said motor, an elongated handle carried by said housing, said handle providing a finger grip body portion and a thumb rest at one end thereof, a recessed portion in said handle at the thumb rest end thereof, opposed grooves and shoulders in opposed wall portions of said recessed portion and thumb controlled switch means for said motor including a plate, edges of said plate being supported in said grooves and against said shoulders whereby said switch means is mounted in said recessed portion.

7. A mixing device comprising, an electric motor adapted to drive a mixing element, a normally substantially horizontally disposed housing for said motor, a handle extending laterally above said housing, the said handle including an integral and substantially upright forepost secured to said housing, a recessed portion in said forepost defined by upright walls, upright grooves in opposed walls of said recess and switch means for said motor, the said switch means including a plate and edge portions of said plate being supported in said grooves whereby to mount said switch means in said recessed portion.

8. A mixing device comprising, an electric motor adapted to drive a mixing element, a normally substantially horizontally disposed housing for said motor, a handle extending laterally above said housing, the said handle including an integral and substantially upright forepost secured to said housing, a recessed portion in said forepost defined by upright walls, upright grooves and shoulders in opposed walls of said recess and switch means for said motor, the said switch means including a plate and edge portions of said plate being supported in said grooves and against said shoulders whereby to mount said switch means in said recessed portion.

9. A mixing device comprising, an electric motor adapted to drive a mixing element, a normally substantially horizontally disposed housing for said motor, a handle extending laterally above said housing, the said handle including an integral and substantially upright forepost secured to said housing, a recessed portion in said forepost defined by upright walls, upright grooves in opposed walls of said recess, switch means for said motor, the said switch means including a plate, edge portions of said plate being supported in said grooves whereby to mount said switch means in said recessed portion, the said recessed portion having top and bottom openings, switch actuating means extending through said top opening and accessible upwardly of said handle forepost and electric current conductors for said switch means extending through said bottom opening into said housing for connection to said motor.

10. A mixing device comprising, an electric motor adapted to drive a mixing element, a normally substantially horizontally disposed housing for said motor, a handle extending laterally above said housing, the said handle including an integral and substantially upright forepost secured to said housing, a recessed portion in said forepost defined by upright walls, upright grooves and shoulders in opposed walls of said recess, switch means for said motor, the said switch means including a plate, edge portions of said plate being supported in said grooves and against said shoulders whereby to mount said switch means in said recessed portion, the said recessed portion having top and bottom openings, switch actuating means extending through said top opening and accessible upwardly of said handle forepost and electric current conductors for said switch means extending through said bottom opening into said housing for connection to said motor.

11. An electric motor device for hand tools which comprises, an electric motor adapted to actuate a tool element, a housing for said motor, a handle secured to said housing, a recessed portion in said handle, grooves in opposed wall portions of said recessed portion and switch means for said motor, the said switch means including a plate and edge portions of said plate being supported in said grooves whereby to mount said switch means in said recessed portion.

12. An electric motor device for hand tools which comprises, an electric motor adapted to actuate a tool element, a housing for said motor, a handle secured to said housing, a recessed portion in said handle, grooves and shoulders in opposed wall portions of said recessed portion and switch means for said motor including a switch plate, edges of said plate being supported in said grooves and against said shoulders whereby to mount said switch means in said recessed portion.

13. An electric motor device for hand tools which comprises, an electric motor adapted to actuate a tool element, a housing for said motor, a handle secured to said housing, said handle providing a finger grip body portion and a thumb rest at one end thereof, a recessed portion in said handle at the thumb rest end thereof, grooves in opposed wall portions defining said recessed portion and thumb controlled switch means for said motor including a switch plate, edges of said plate being supported in said grooves whereby to mount said switch means in said recessed portion.

14. An electric motor device for hand tools which comprises, an electric motor adapted to actuate a tool element, a housing for said motor, a handle secured to said housing, said handle providing a finger grip body portion and a thumb rest at one end thereof, a recessed portion in said handle at the thumb rest end thereof, grooves and shoulders in opposed wall portions defining said recessed portion and thumb controlled switch means for said motor including a switch plate, edges of said plate being supported in said grooves and against said shoulders whereby to mount said switch means in said recessed portion.

15. An electric motor device for hand tools which comprises, an electric motor adapted to actuate a tool element, a housing for said motor, a handle secured to said housing, a recessed portion in said handle, grooves in opposed wall portions of said recessed portion and switch means for said motor, the said switch means being supported in said grooves whereby to mount said switch means in said recessed portion.

16. An electric motor device for hand tools which comprises, an electric motor adapted to actuate a tool element, a housing for said motor, a handle secured to said housing, a recessed portion in said handle, grooves and shoulders in opposed wall portions of said recessed portion and switch means for said motor, the said switch means being supported in said grooves and against said shoulders whereby to mount said switch means in said recessed portion.

References Cited in the file of this patent

UNITED STATES PATENTS

| | | |
|---|---|---|
| 452,005 | Short | May 12, 1891 |
| 1,827,372 | Riddell | Oct. 13, 1931 |
| 2,103,922 | Van Guilder | Dec. 28, 1937 |
| 2,179,745 | Kochner | Nov. 14, 1939 |
| 2,192,845 | Bean | Mar. 5, 1940 |
| 2,247,708 | Jordan | July 1, 1941 |
| 2,294,713 | Boerger | Sept. 1, 1942 |
| 2,323,945 | Strauss et al. | July 13, 1943 |
| 2,406,150 | Kennedy | Aug. 20, 1946 |
| 2,477,150 | Snyder et al. | July 26, 1949 |
| 2,483,727 | Frisbie | Oct. 4, 1949 |
| 2,582,229 | Brown et al. | Jan. 15, 1952 |
| 2,615,942 | Edman | Oct. 28, 1952 |

FOREIGN PATENTS

| | | |
|---|---|---|
| 659,044 | Great Britain | Oct. 17, 1951 |
| 625,270 | Germany | Feb. 6, 1936 |